(12) United States Patent
Shah-Nazaroff et al.

(10) Patent No.: US 7,058,635 B1
(45) Date of Patent: Jun. 6, 2006

(54) METHOD AND APPARATUS FOR SEARCHING THROUGH AN ELECTRONIC PROGRAMMING GUIDE

(75) Inventors: Anthony A. Shah-Nazaroff, Santa Clara, CA (US); Jean M. Goldschmidt Iki, San Jose, CA (US); Kenneth Alan Moore, Ben Lomond, CA (US); David N. Hackson, Sunnyvale, CA (US); Gregory D. Buscheck, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 09/183,282

(22) Filed: Oct. 30, 1998

(51) Int. Cl.
    *G06F 17/30* (2006.01)
    *H04N 11/00* (2006.01)
    *H04N 7/00* (2006.01)

(52) U.S. Cl. ............ 707/100; 348/460; 348/569; 725/39; 725/45; 725/52; 725/53

(58) Field of Classification Search ............ 707/100; 345/327; 348/460, 569; 463/42; 725/1, 7, 725/39, 52
See application file for complete search history.

(56) References Cited

U.S. PATENT DOCUMENTS

| | | | |
|---|---|---|---|
| 5,410,344 A | * 4/1995 | Graves et al. | 348/1 |
| 5,559,548 A | 9/1996 | Davis et al. | 348/6 |
| 5,589,892 A | 12/1996 | Knee et al. | 348/731 |
| 5,629,733 A | * 5/1997 | Youman et al. | 348/7 |
| 5,671,411 A | * 9/1997 | Watts et al. | 395/615 |
| 5,774,206 A | 6/1998 | Wasserman et al. | 395/200.77 |
| 5,781,246 A | * 7/1998 | Alten et al. | 348/569 |
| 5,795,228 A | * 8/1998 | Trumbull et al. | 463/42 |
| 5,940,073 A | * 8/1999 | Klosterman et al. | 715/721 |
| 5,999,934 A | * 12/1999 | Cohen et al. | 707/100 |
| 6,002,394 A | * 12/1999 | Schein et al. | 345/327 |
| 6,005,563 A | * 12/1999 | White et al. | 345/327 |
| 6,005,631 A | * 12/1999 | Anderson et al. | 348/460 |
| 6,064,378 A | * 5/2000 | Chaney et al. | 345/327 |
| 6,184,877 B1 | * 2/2001 | Dodson et al. | 345/327 |
| 6,209,130 B1 | * 3/2001 | Rector, Jr. et al. | 725/50 |

FOREIGN PATENT DOCUMENTS

| | | | |
|---|---|---|---|
| WO | WO 98 26584 | 6/1998 | |
| WO | WO 98/37694 | * 8/1998 | |

OTHER PUBLICATIONS

International Search Report, PCT/US99/25428, Oct. 28, 1999, 6 pages.
Supplemental EPO Search Report, Feb. 13, 2004, 3 pages.
"IGUIDE: iGuide debuts TV Guide On line centerpiece"; M2 Presswire; Mar. 8, 1996; page 1.*
W Dobbie, BT Laboratories; "Interactive Electronic Programme Guides"; IEEE; Jan. 16, 1998; pp. 1–5.*

* cited by examiner

*Primary Examiner*—Vincent Millin
*Assistant Examiner*—Ella Colbert
(74) *Attorney, Agent, or Firm*—Blakely, Sokoloff, Taylor & Zafman LLP (57) ABSTRACT

A method for managing entertainment system data includes obtaining a record corresponding to a first entertainment selection that is selected. A selectable identifier corresponding to a first set of entertainment system data in the record is presented on a display device. A search for a second entertainment selection having a corresponding second set of entertainment system data related to the first set of entertainment system data is performed when the selectable identifier is selected. A result of the search is presented on the display device.

33 Claims, 10 Drawing Sheets

| ESI (THE FUGITIVE) 511 | ID (TITLE) 512 | DATA (THE FUGITIVE) 512 | ID (RATING) 513 | DATA (PG-13) 513 | ID (STARS) 514 | DATA (3) 514 | | |
|---|---|---|---|---|---|---|---|---|
| | ID (GENRE) 515 | DATA (DRAMA) 515 | ID (ACTOR) 516 | DATA (HARRISON FORD) 516 | ID (ACTOR) 517 | DATA (TOMMY LEE JONES) 517 | ID (SYNOPSIS) 518 | DATA (BASED ON....) 518 |
| | ID (LINK THE FUGITIVE) 519 | DATA (www.xyz.com) 519 | ID (LINK HARRISON FORD) 520 | DATA (SEARCH) 520 | ID (LINK TOMMY LEE JONES) 521 | DATA (SEARCH) 521 | | |

The Fugitive ~711

Starring: (PG-13) *** Drama

Harrison Ford ~712    Tommy Lee Jones ~713

Synopsis : Based on the 1960's TV series about an innocent doctor on the run from the law as he pursues his wife's real killers.

| Date | Station | Type | Title | Duration |
|---|---|---|---|---|
| 8/7 8:00pm Th | ABC 7 | Drama | The Fugitive | 2 hr 15 min |

FIG. 8

The Fugitive    (PG-13)    ★★★    Drama

Starring: Harrison Ford, Tommy Lee Jones

Synopsis: Based on the 1960's TV series about an innocent doctor on the run from the law as he pursues his wife's real killers.

| Date | Station | | Type | Title | Duration |
|---|---|---|---|---|---|
| 8/7 12:00am Thr | HBO | 15 | Drama | Clear and Present Danger | 2 hr 30 min |
| 8/7 6:00pm Thr | HBO | 15 | Drama | Clear and Present Danger | 2 hr 30 min |
| 8/7 8:00pm Thr | ABC | 7 | Drama | The Fugitive | 2 hr 15 min |
| 8/8 12:00am Thr | SHO | 17 | Drama | Clear and Present Danger | 2 hr 30 min |
| 8/8 4:00pm Fri | SHO | 17 | Drama | Clear and Present Danger | 2 hr 30 min |
| 8/8 6:00pm Fri | TNT | 33 | Action | Indiana Jones and the Temp | 2 hr 30 min |
| 8/8 6:00pm Fri | SHO | 17 | Drama | Clear and Present Danger | 2 hr 30 min |

METHOD AND APPARATUS FOR SEARCHING THROUGH AN ELECTRONIC PROGRAMMING GUIDE

FIELD OF THE INVENTION

The present invention relates to the field of entertainment systems. Specifically, the present invention relates to graphical user interfaces (GUI) in entertainment systems that display entertainment system data.

BACKGROUND OF THE INVENTION

A current trend in the electronics and computer industry is the convergence of computer systems and more traditional entertainment system components. As this convergence continues, more components in these systems will be combined together resulting in an increase in the number of entertainment selections and entertainment system data made available to users.

Current mechanisms for storing and providing entertainment system data to users are component specific. For example, programming guides made available by many cable companies provide some entertainment system data relating to entertainment selections available to the users. Typically, the programming guides provide an on-screen display of programming information for channels supported by the cable system. The programming guides, however, do not store or display entertainment system data from sources other than the cable company to the user. Thus, for example, if a user's entertainment system includes a digital satellite system (DSS), a vertical blanking interval (VBI) decoder, a modem, a network connection, or a video library, the entertainment system data from these entertainment selection would not be available to the user on the cable system's programming guide. In addition, the programming guides typically display limited information about an entertainment selection. The information is usually limited to the title of the entertainment selection, the time it is broadcasted, and the channel broadcasting the entertainment selection. The information is typically presented in a static text format.

SUMMARY

A method for managing entertainment system data is disclosed. A record corresponding to a first entertainment selection that is selected is obtained. A selectable identifier corresponding to a first set of entertainment system data in the record is presented on a display device. A search for a second entertainment selection having a corresponding second set of entertainment system data related to the first set of entertainment system data is performed when the selectable identifier is selected. A result of the search is presented on the display device.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
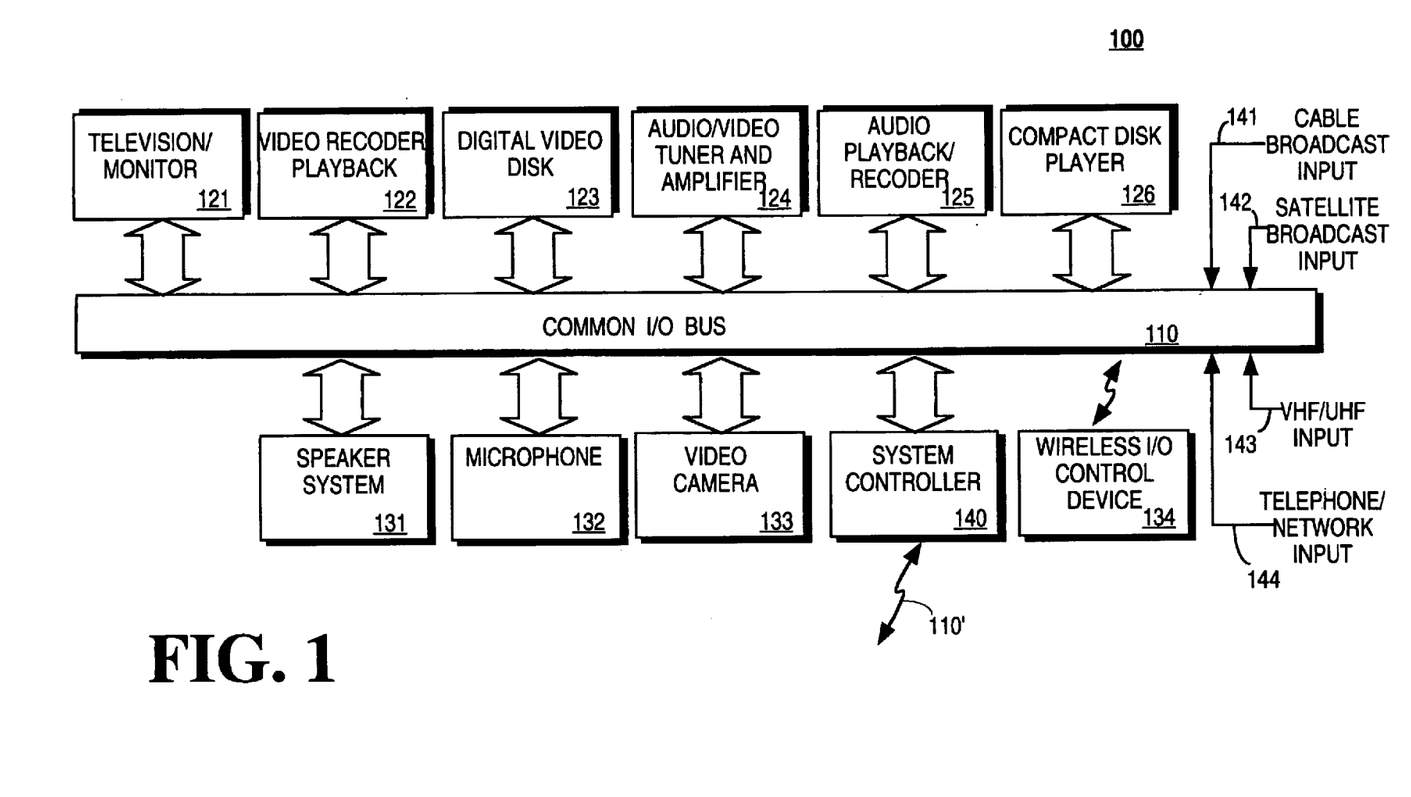
FIG. 1 is a block diagram illustrating the system components of one embodiment of an entertainment system according to the present invention.

FIG. 1 is a block diagram illustrating system components of an entertainment system 100 according to one embodiment of the present invention. The entertainment system includes a common input/output (I/O) bus 110 that connects the system components in the entertainment system 100 together. It should be appreciated that the common I/O bus 110 is illustrated to simplify the routing of signals between the entertainment system components. The common I/O bus 110 may represent a plurality of known mechanisms and techniques for routing I/O signals between the computer system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the entertainment system 100 includes a speaker system 131, microphone 132, video camera 133, and a wireless I/O control device 134. In one embodiment, wireless I/O control device 134 is an entertainment system remote control unit, which communicates with the components of the entertainment system 100 through IR signals. In another embodiment, wireless I/O control device 134 may be a wireless keyboard and cursor-positioning device that communicates with the components of entertainment system 100 through IR signals or RF signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 100 also includes a system controller 140. According to one embodiment of the present invention, the system controller 140 operates to store and display entertainment system data available from a plurality of entertainment system data sources. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the entertainment system components of the entertainment system 100, although it is understood that each of the components may be individually controlled with wireless I/O control device 134.

As illustrated in FIG. 1, system 100 may be configured to receive entertainment selections and entertainment system data from various entertainment selection sources. In one embodiment, entertainment system 100 receives entertainment selections and entertainment system data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), telephone/computer network broadcast 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming. The cable broadcast input 141, satellite broadcast input 142, VHF/UHF broadcast input 143, and telephone/computer network broadcast input 144 may be received by the audio/video tuner and amplifier 124, the system controller 140, or other component on the entertainment system 100.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
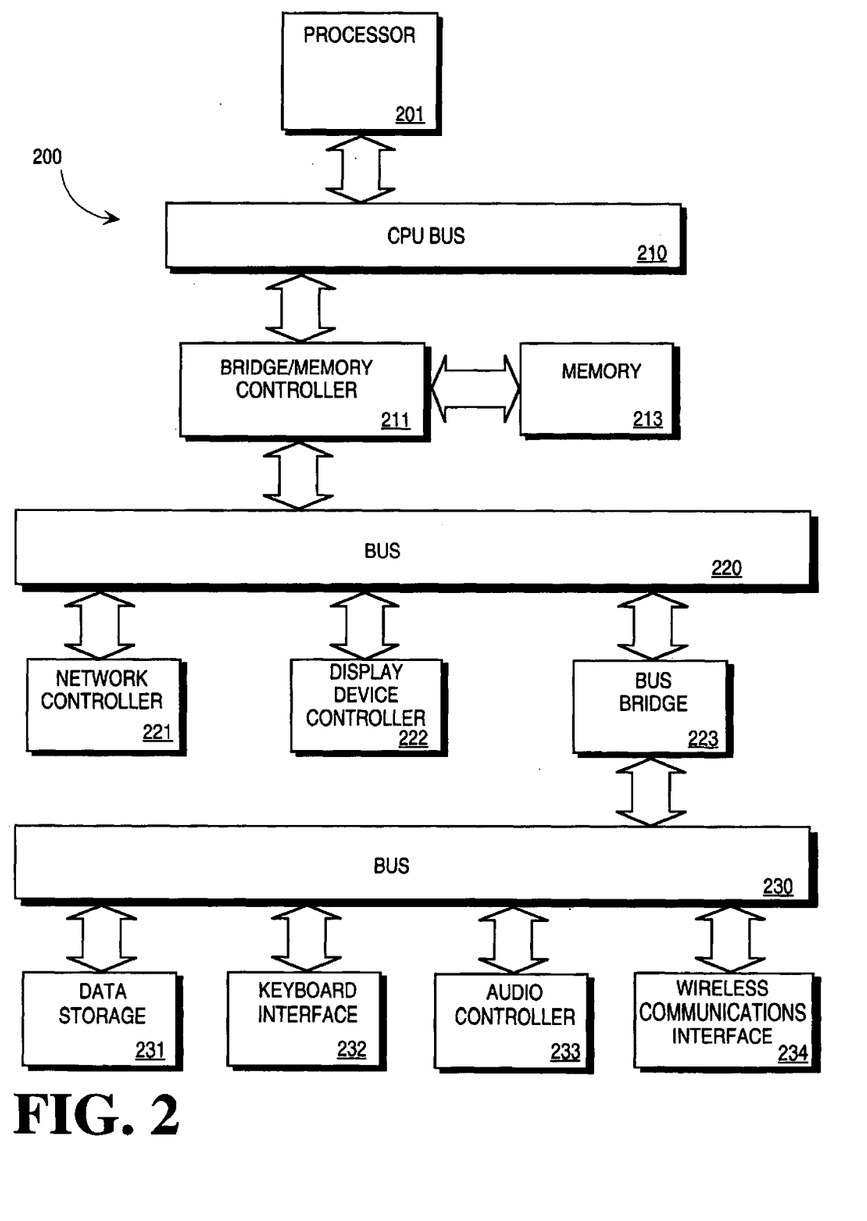
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210, which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201. A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. According to an embodiment of the present invention, the display device may be implemented by the television/monitor 121 (shown in FIG. 1).

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds. A wireless communications interface 234 is coupled to the second I/O bus 230. The wireless communications interface 234 may be an IR transceiver or a RF transceiver for transmitting and receiving signals between system components of the entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, managing entertainment system data is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to manage entertainment system data, as will be described hereafter. In alternative embodiments, hard-wire circuitry may be used in place of or in combination with software instructions to implement the present invention. Thus, the present invention is not limited to any specific combination of hardware circuitry and software.

Figure 3:
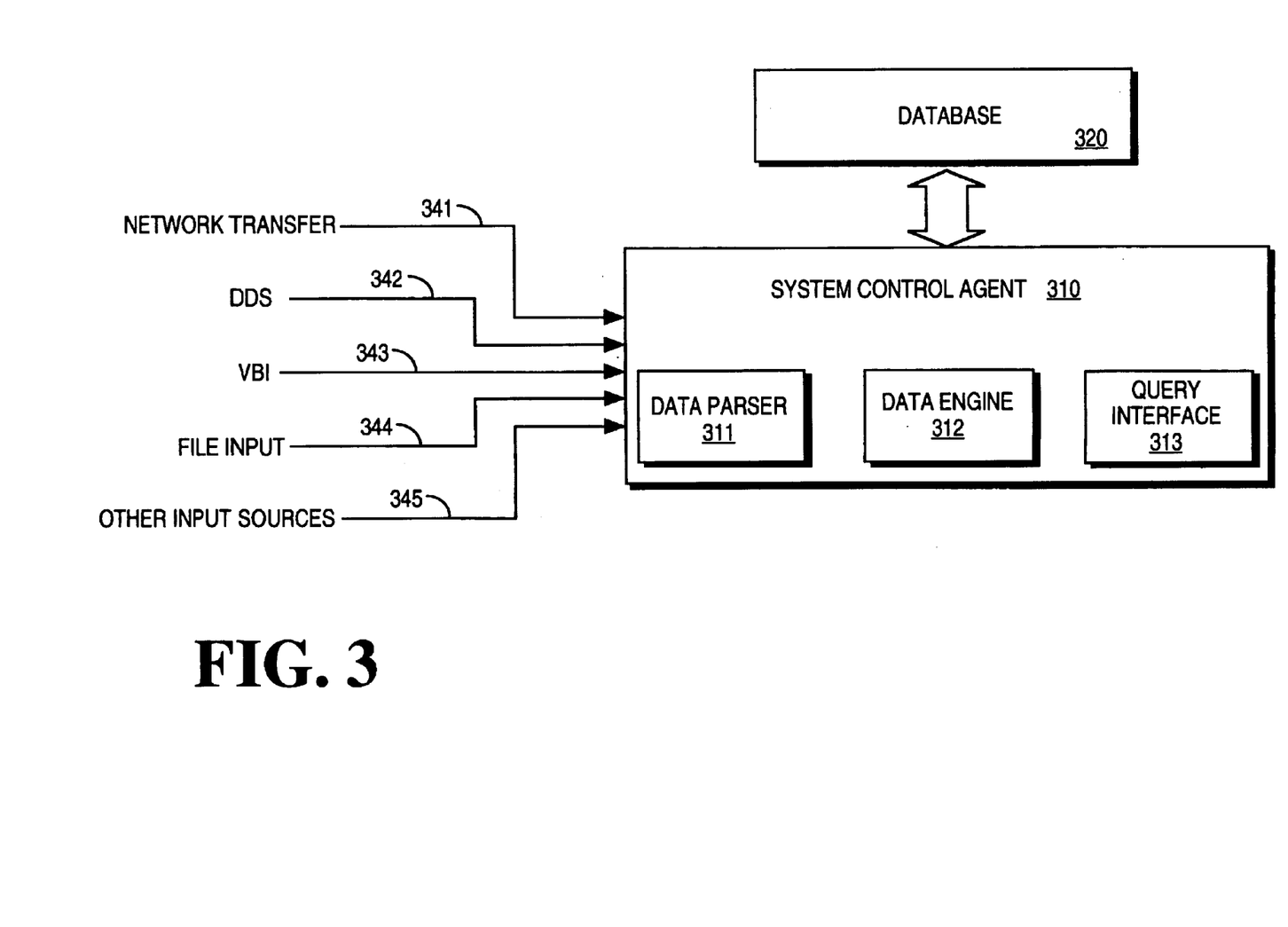
FIG. 3 is a block diagram of modules implementing an embodiment of a database system according to an embodiment of the present invention.

FIG. 3 is a block diagram illustrating modules implementing a database system 300 according to an embodiment of the present invention. In a preferred embodiment of the present invention, the modules are implemented in software and reside in main memory 213 (shown in FIG. 2) of the computer system 200 (shown in FIG. 2) as sequences of instructions. It should be appreciated that the modules may be implemented by hardware as components coupled to the bus 220 (shown in FIG. 2) or a combination of both hardware and software. Block 310 represents a system control agent that receives entertainment system data from multiple sources. The system control agent 310 manages the organization and retrieval of the entertainment system data in the database 320, and presents the entertainment system data to users. The system control agent 310 includes a data parser 311, data engine 312, and query interface 313.

Entertainment system data may be received by the system control agent 310 from a plurality of sources. These sources may include modem transfer 341, DSS 342, VBI 343, file input stream 344, or other input streams 345. Network transfer source 341 provides entertainment system data obtained from remote systems via a conventional modem. According to one embodiment of the present invention, the remote systems are web servers accessed via the Internet using a plain old telephone service (POTS) connection, an integrated services digital network (ISDN) line, or other network connection. DSS source 342 provides entertainment system data obtained via a digital broadcast and a digital satellite receiver. According to one embodiment of the present invention, the entertainment system data is received via a separate digital channel by the DSS receiver. VBI source 343 provides entertainment system data from the vertical blanking interval of a television broadcast. The entertainment system data is decoded from the VBI of the television broadcast by a VBI decoder. File input stream 344 provides entertainment system data obtained from a computer file. The file may be located locally on the computer system 200 or remotely at another computer system. The file may contain, for example, a video clip, a movie review, a video game or other application. Other input streams 345 represent other conventional sources from which entertainment system data could be obtained. It is to be appreciated that any other conventional medium could be used to provide entertainment system data to system control agent 310, including RF broadcasts, ultrasonic broadcasts, IR broadcasts, or other broadcasts. It should also be appreciated that entertainment system data may be provided by the users of the entertainment system 100 (shown in FIG. 1). Entertainment system data may be obtained from any one or more of the sources 341–345.

Entertainment system data includes data related to entertainment selections. The entertainment selections may include programs, music selections, software applications, files, Internet broadcast and other selections that may be made available to users via the entertainment system 100. Entertainment system data may include information describing an entertainment selection or other information related to the entertainment selection. Examples of entertainment system data include television program information, radio station information, "video-on-demand" program information, laser disc availability, compact disk availability, DVD availability, CD-ROM availability, VHS or 8 mm tape availability, software application titles, Intercast™ broadcasts information, network identifiers such as Uniform Resource Locators (URLs), or other data.

In the illustrated embodiment, entertainment system data received from each of the sources 341–345 are in a different, source specific format. Data parser 311 receives the entertainment system data from the sources 341–345 and translates the entertainment system data into a unitary format. The entertainment system data received from the sources 341–345 may include a plurality of information related to an entertainment selection. The data parser 311 generates a record for data corresponding to each entertainment selection. Within each record, the data parser 311 organizes the entertainment system data related to each entertainment selection into traits or set of entertainment system data. Each trait includes an identifier portion that provides a generic description of the trait and a data portion that provides specific data related to the trait or a location of where the specific data may be found. According to one embodiment of the present invention, an identifier portion may be "Title", "Actors", "Program Rating", "Source of Programming", or "Time of Broadcast" and the data portion may be the title of an entertainment selection, actors appearing in the entertainment selection, rating of the entertainment selection, the station where the entertainment selection may be viewed, and the time the entertainment selection is broadcasted. According to another embodiment of the present invention, the identifier portion may be "Program Theme Song", "Video Trailer", "Audio Trailer", "Images of Cast", "Program's Home Page", "Program's Newsgroup", or "Articles about the Program and Cast" and the data portion may include a location of where the information relating to the identifier may be found. For example, the data portion may include a location such as a local address of a graphics file or an audio file stored in the data storage device 232 (shown in FIG. 2) that may be executed. Alternatively, the data portion may include a location such as an Internet address or an URL of a web server that includes a file that contains the information listed in the identifier portion.

Figure 4:
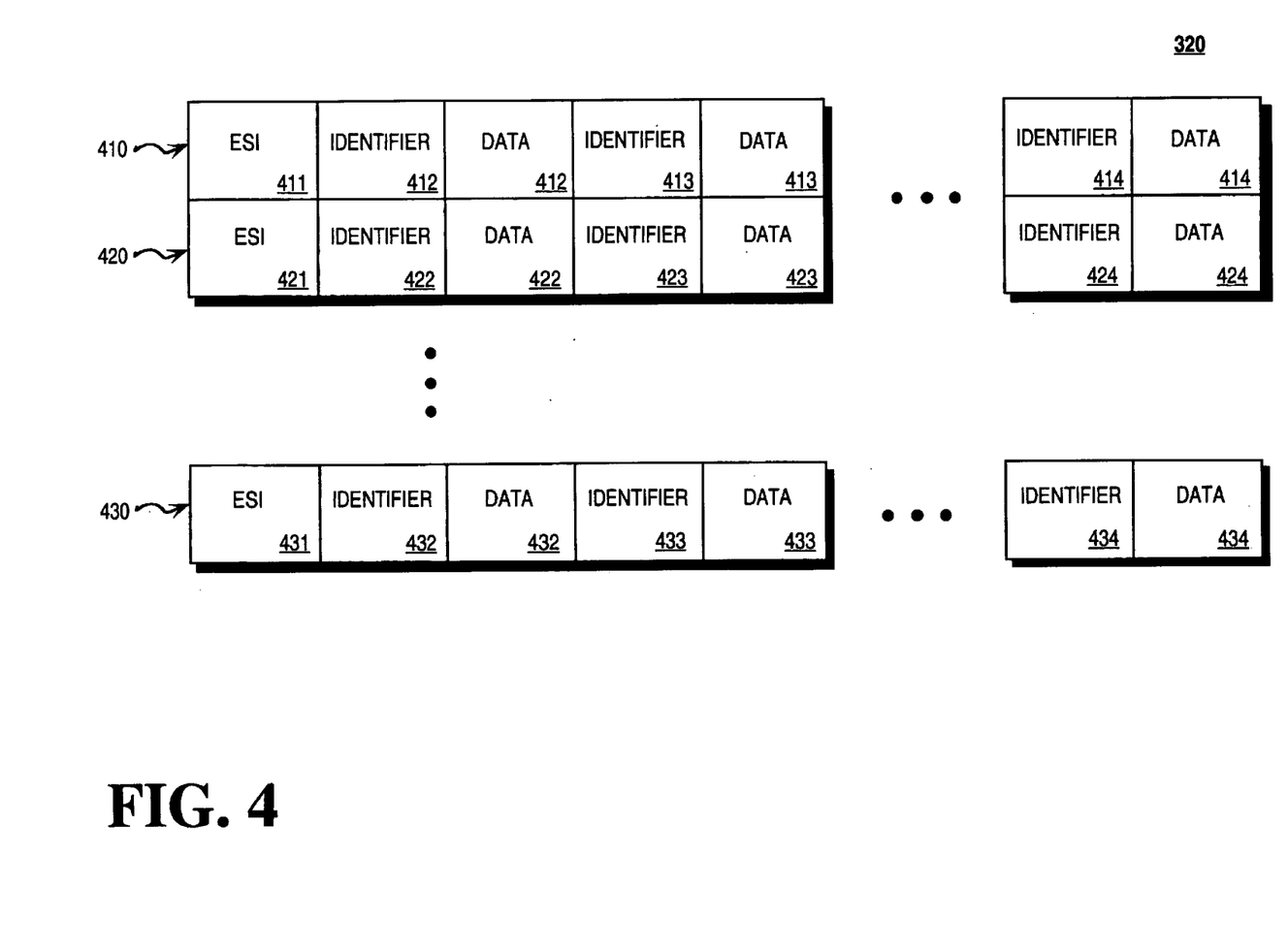
FIG. 4 illustrates entertainment system data stored in a database according to an embodiment of the present invention.

The data engine 312 receives the entertainment data in the unitary format from the data parser 311 and stores the entertainment system data in the database 320. FIG. 4 illustrates entertainment system data records stored in a database 320 according to an embodiment of the present invention. The database 320 includes multiple records 410, 420, and 430. Each of the records 410, 420, and 430 includes an entertainment selection identifier 411, 421, and 431, respectively. The entertainment selection identifiers 410, 420, and 430 identify an entertainment selection to which a record corresponds. Each of the records 410, 420, and 430 are shown to include a plurality of traits or sets of entertainment system data. It should be appreciated that each record may include any number of traits. Record 410 includes traits 412, 413, and 414. Record 420 includes traits 422, 423, and 424. Record 430 includes traits 432, 433, and 434. Each of the traits includes an identifier portion and a data portion. Referring back to FIG. 3, it should be appreciated that the data parser 311 may organize the entertainment system data using any known technique into any known format and that the data engine 312 may configure the database 320 according to any known format.

The query interface 313 configures a graphical user interface that allows a user to access the entertainment system data stored in the database 320. According to an embodiment of the present invention, the query interface 313 presents the entertainment system data stored in the database 320 in text form. According to another embodiment of the present invention, the query interface 313 presents the entertainment system data stored in the database 320 using multimedia identifiers that may include graphical images, animation, audio clips, or other multimedia identifiers. For example, the query interface 313 may present the identifiers of traits of an entertainment selection using selectable identifiers. When a selectable identifier is selected, the query interface 313 retrieves information in the data portion corresponding to the identifier and presents it to the user.

According to an aspect of this embodiment of the present invention, presenting the information to the user may include displaying the information stored in the data section when the information is specific data related to the trait. According to another aspect of this embodiment of the present invention, presenting the information may include using the information in the data section to locate additional information when the information is a location. In this aspect of this embodiment, the multimedia identifier may be a hyper link to a remote web server or a link to a system component local to the graphical user interface.

It should be appreciated that a first set of entertainment system data may include traits having an identifier portion that references another trait. The first entertainment system data may include a data portion that includes instructions to be executed by the query interface 313. The instructions may include instructions for the query interface 313 to retrieve additional entertainment system data related to the data portion of the first set of entertainment system data, perform a search in the database 320 for a second entertainment selection identifier having a second set of entertainment system data related to the first set entertainment system data, or other instructions.

Figure 5:
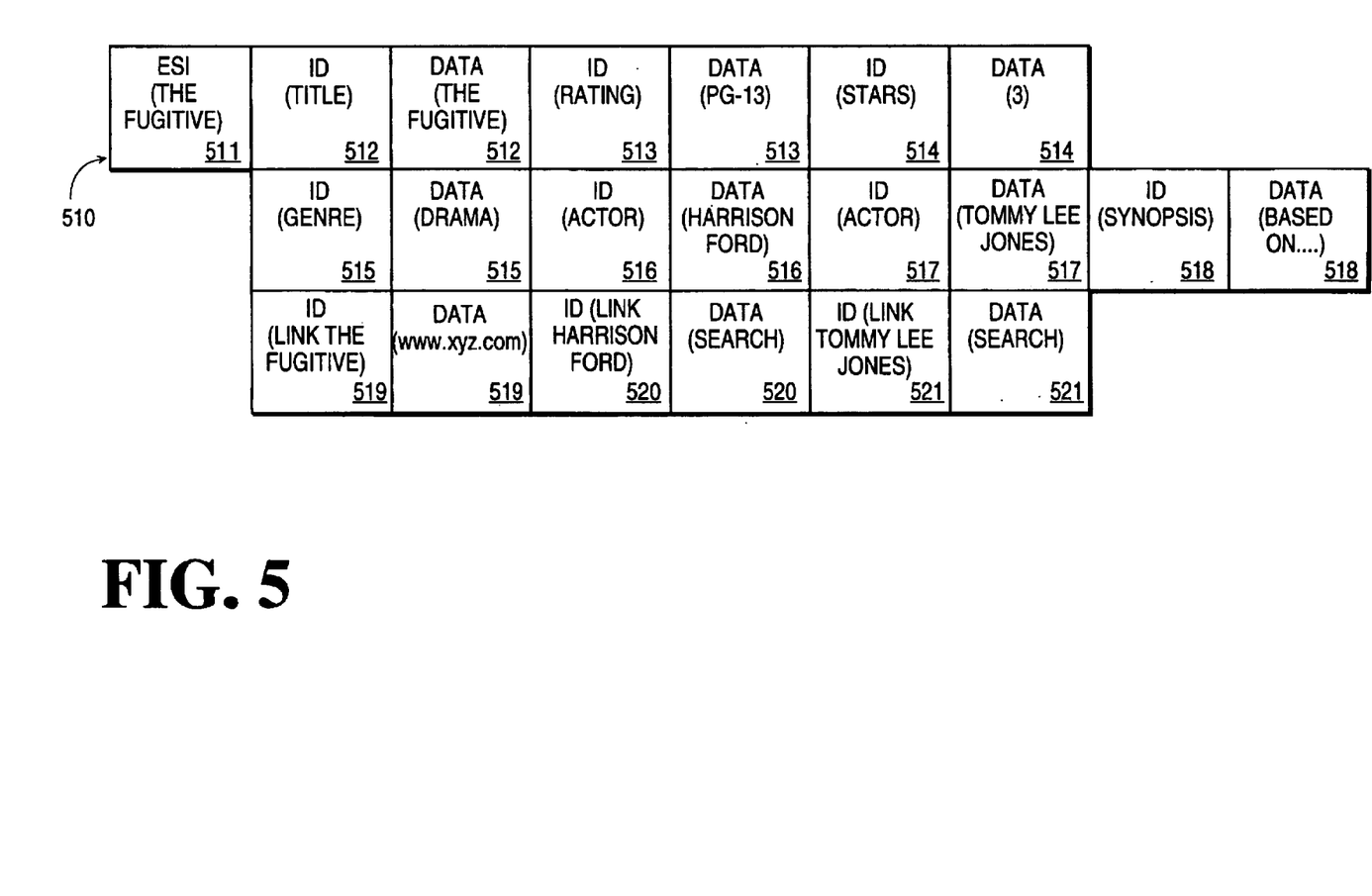
FIG. 5 illustrates an example of a record that corresponds to an entertainment selection according to an embodiment of the present invention.

FIG. 5 illustrates an example of how entertainment system data is sorted in a record in the database 320 (shown in FIG. 3) according to an embodiment of the present invention. Record 510 includes an entertainment selection identifier 511 that identifies an entertainment selection to which the record corresponds. The record 510 includes a first set of entertainment system data 512 having an identifier that indicates that the first set of entertainment system data 512 corresponds to the title of the entertainment selection. The record 510 includes a second set of entertainment system data 513 having an identifier that indicates that the second set of entertainment system data 513 corresponds to a rating of the entertainment selection. The record 510 includes a third set of entertainment system data 514 having an identifier that indicates that the third set of entertainment system data 514 corresponds to a number of stars given to the entertainment selection. The record 510 includes a fourth set of entertainment selection data 515 having an identifier that indicates that the fourth set of entertainment system data 515 corresponds to a genre of the entertainment selection. The record 510 includes a fifth set of entertainment selection data 516 having an identifier that indicates that the fifth set of entertainment system data 516 corresponds to an actor of the entertainment selection. The record 510 includes a sixth set of entertainment system data 517 having an identifier that indicates that the sixth set of entertainment system data 517 corresponds to an actor of the entertainment selection. The record includes a seventh set of entertainment system data 518 having an identifier that indicates that the seventh set of entertainment system data 518 corresponds to a synopsis of the entertainment selection.

The record 510 also includes entertainment system data that are linked to other entertainment system data. The record 510 includes an eighth set of entertainment system data 519 having an identifier that indicates that the eighth set of entertainment system data 519 is linked to the data in the first set of entertainment system data 512. According to an embodiment of the present invention, the query interface 313 (shown in FIG. 3) generates a selectable identifier to the first set of entertainment system data 512. When selected, the query interface 313 performs instructions stored in the data portion of the eighth set of entertainment system data 519. The instructions may, for example, direct the query interface 313 to access and show a video clip located at a specified Internet Protocol address. The record 510 includes an ninth set of entertainment system data 520 having an identifier that indicates that an ninth set of entertainment system data 520 is linked to the data in the fifth set of entertainment system data 516. According to an embodiment of the present invention, the query interface 313 generates a selectable identifier to the fifth set of entertainment system data 516. When selected, the query interface 313 performs the instructions stored in the data portion of the ninth set of entertainment system data 520. The instructions may, for example, direct the query interface 313 to search the data base 320 for other entertainment selections which are related to the data portion of the fifth set of entertainment system data 516. The record 510 includes a tenth set of entertainment system data 521 having an identifier that indicates that the tenth set of entertainment system data 521 is linked to the data in the sixth set of entertainment system data 517. According to an embodiment of the present invention, the query interface 313 generates a selectable identifier to the sixth set of entertainment system data 517. When selected, the query interface 313 performs the instructions stored in the data portion of the tenth set of entertainment system data 521. The instructions may, for example, direct the query interface 313 to search the data base 320 for other entertainment selections which are related to the data portion of the sixth set of entertainment system data 517.

The data parser 311 (shown in FIG. 3), the data engine 312 (shown in FIG. 3), and the query interface 313 may be implemented using any known circuitry or any known technique. In an embodiment of the present invention where the system control agent 310 is implemented in hardware, the data parser 311, the data engine 312, and the query interface 313 all reside on a single semiconductor substrate.

Figure 6:
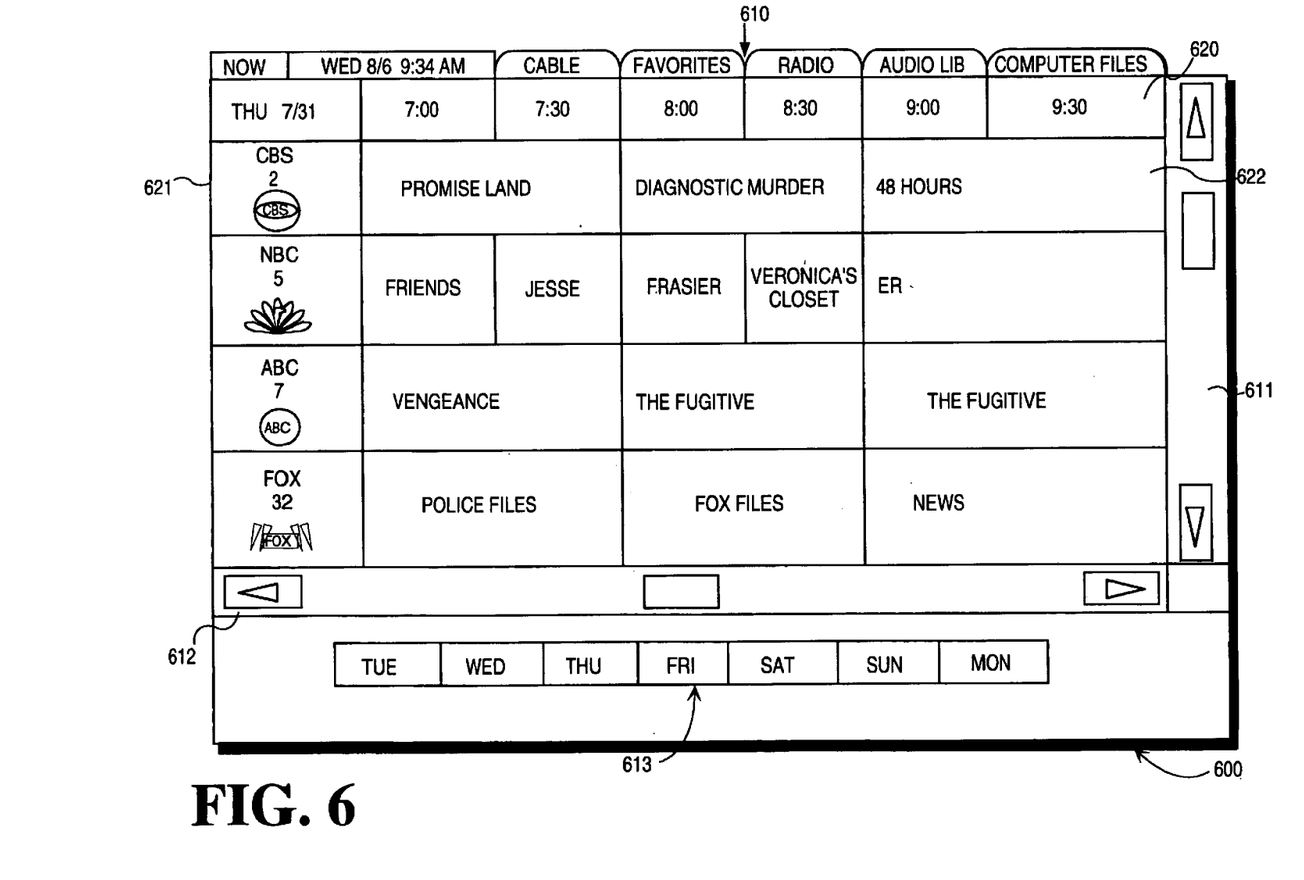
FIG. 6 illustrates a graphical user interface for an electronic programming guide according to an embodiment of the present invention.

FIG. 6 illustrates a graphical user interface 600 for an electronic programming guide according to an embodiment of the present invention. The graphical user interface 600 includes an entertainment category display section 610 that lists the categories of entertainment system data that may be displayed by the graphical user interface 600. The graphical user interface 600 includes a selection listing area 622 that displays the names of entertainment selections that are broadcasted, a time heading 620 that displays the times that the entertainment selections are broadcasted, and a source heading 621 that displays the sources of the entertainment selections all in a grid format. The graphical user interface 600 also includes scroll bars 611 and 612 and a day of the week selection bar 613 to allow a user to browse the entertainment system data stored in the database 320. According to an embodiment of the present invention, sections of the selection listing area 622 corresponding to an entertainment selection may be selected by a user. When selected, the query interface (shown in FIG. 3) generates a second graphical user interface that displays additional entertainment system data corresponding to the entertainment selection.

Figure 7:
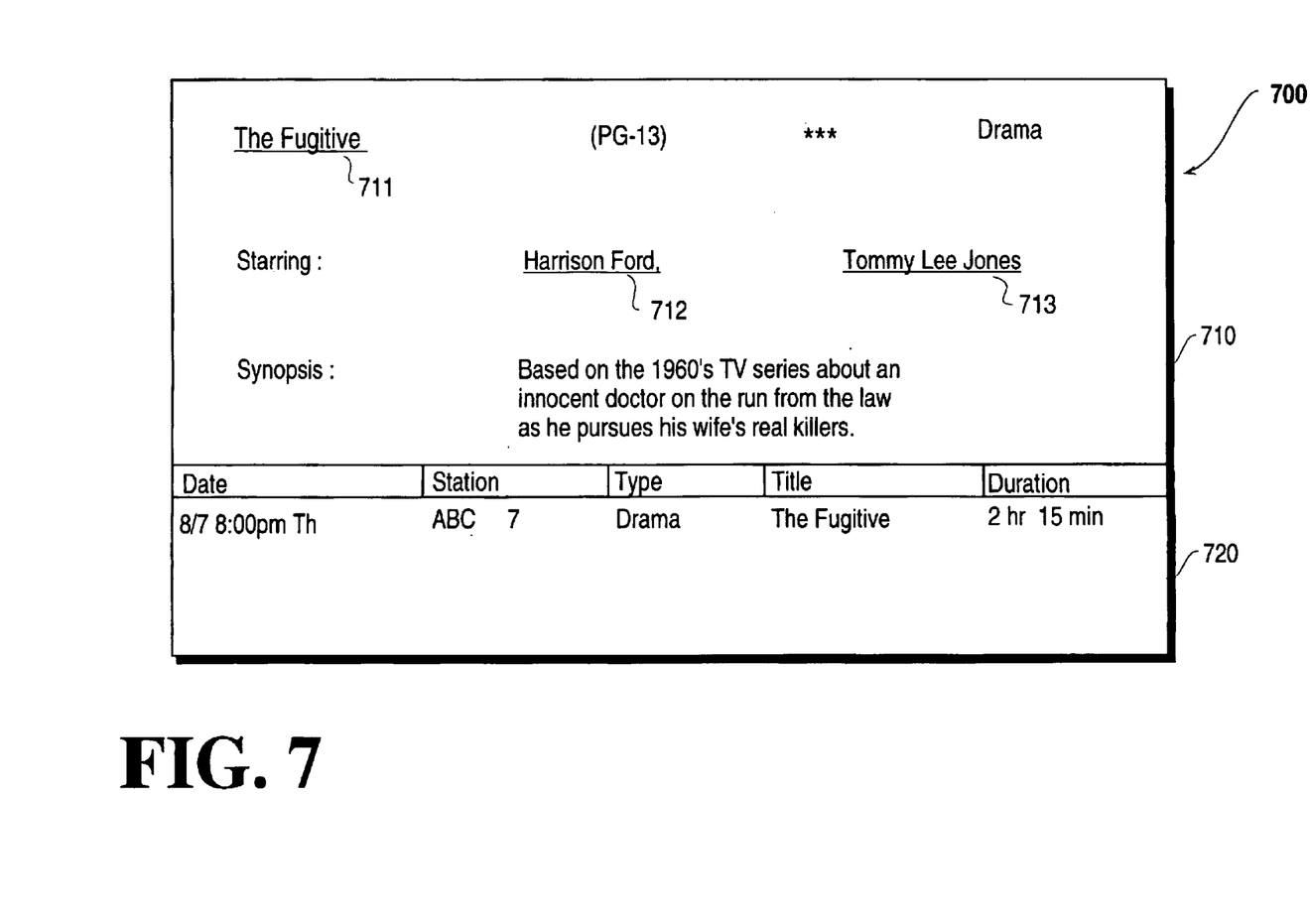
FIG. 7 illustrates a graphical user interface for a synopsis box according to an embodiment of the present invention.

FIG. 7 illustrates the second graphical user interface 700 according to an embodiment of the present invention. The second graphical user interface 700 includes a first display area 710 or a "synopsis box" that displays additional entertainment system data related to an entertainment selection corresponding to the section of the selection listing area 622 that is selected. According to this example, the first display area 710 displays a plurality of entertainment system data in text form. The entertainment system data 711–717 include information about the name of the entertainment selection, rating of the entertainment selection, number of stars given to the entertainment selection, genre of the entertainment selection, cast of the entertainment selection, and a synopsis of the entertainment selection. The first display area 710 also uniquely presents entertainment system data that are linked. The entertainment system data that are linked are shown in FIG. 7 to be presented with underlining. In this example, the entertainment system data corresponding to the title 711, and actors 712, and 713 are linked. It should be appreciated that the entertainment system data that are linked may also be presented using a multimedia identifier, or a font, color, or other unique format that distinguishes it from other entertainment system data that are not linked. The entertainment system data that are linked are presented as user selectable identifiers.

The graphical user interface 700 may optionally include a second display area 720 or second synopsis box. The second display area 720 may include additional entertainment system data related to the entertainment selection including date, source, and duration information of the entertainment selection.

Figure 8:
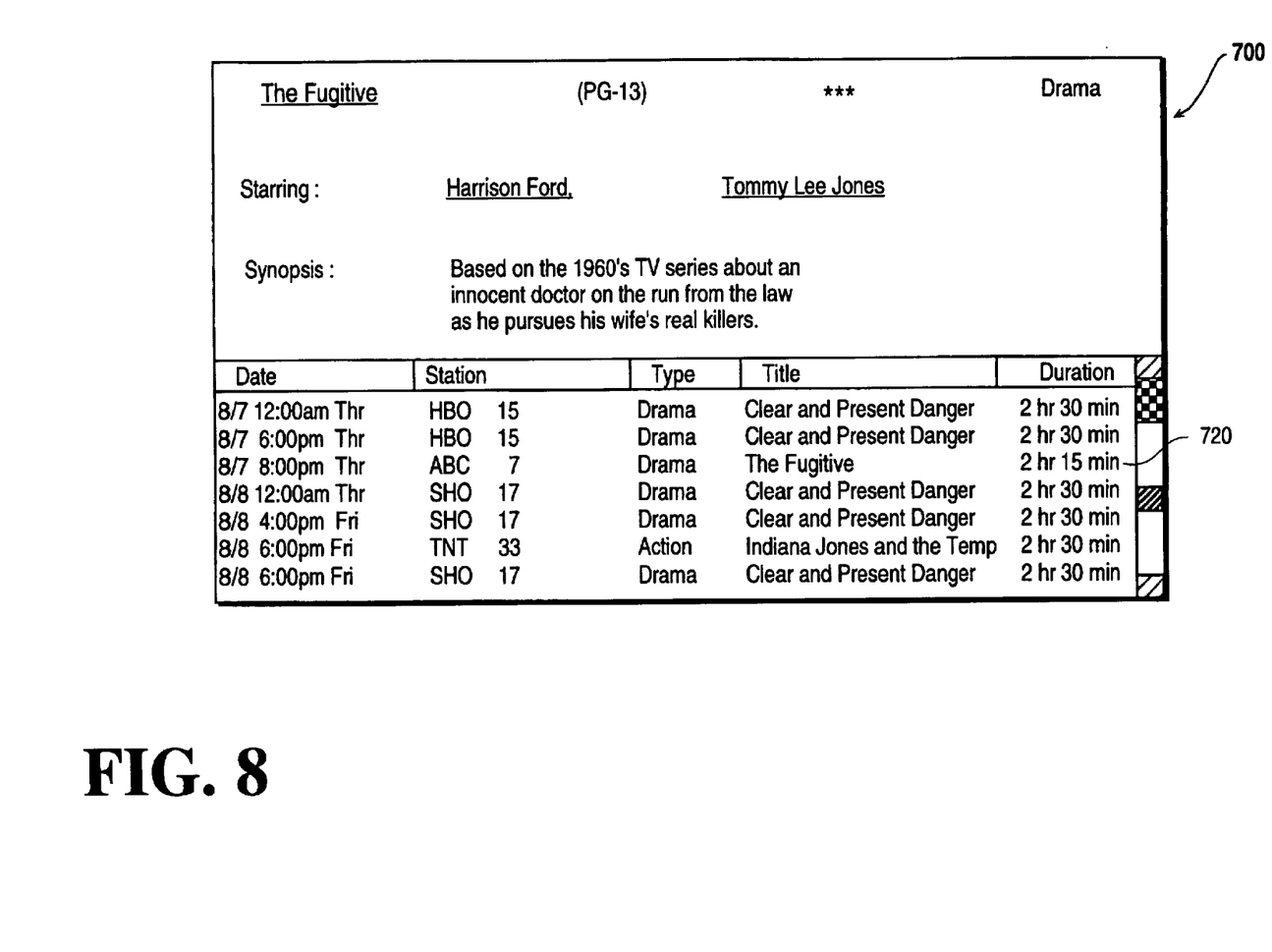
FIG. 8 illustrates a graphical user interface for a synopsis box returning linked entertainment system data according to an embodiment of the present invention.

When selected, the selectable identifiers 711, 712, and 713 prompt the query interface 313 (shown in FIG. 3) to access and deliver additional entertainment system data related to the identifier. For example, if selectable identifier 711 is selected, a video clip of the entertainment selection may be accessed and played on a display area such as the second display area 720 or other display area on the display device. Alternatively, if the selectable identifier 712 corresponding to a first actor is selected, a search of entertainment selections that will be broadcasted in which the first actor has starred in may be performed and the result of the search may be displayed on the second display area 720 or other display area on the display device. FIG. 8 illustrates the results of the search as displayed in the second display area 720.

Figure 9:
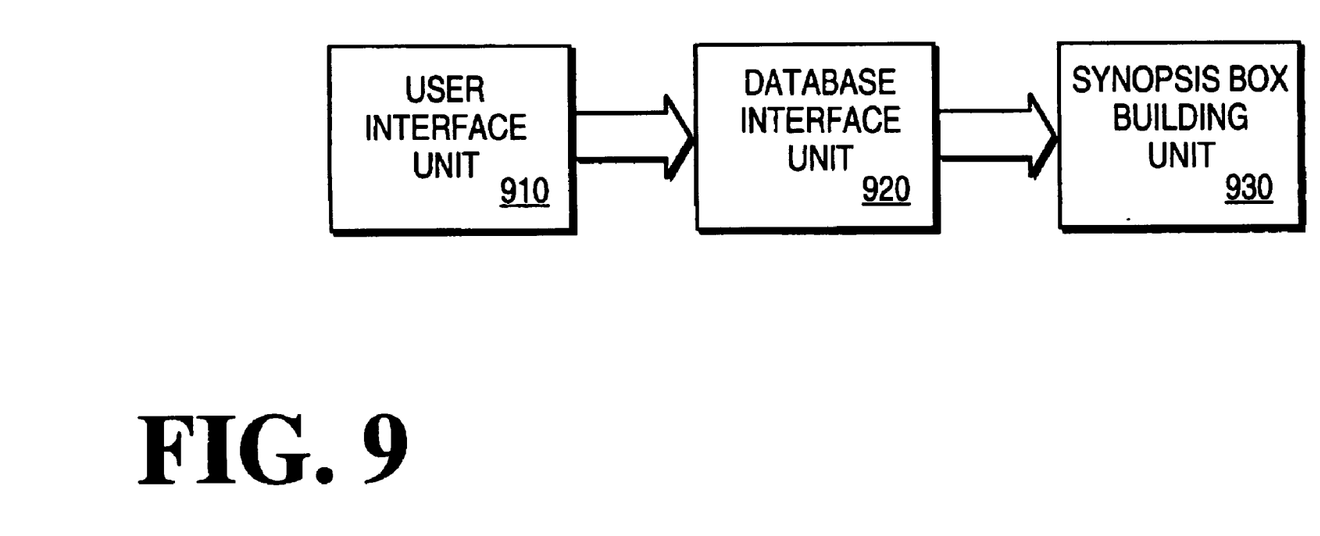
FIG. 9 is a block diagram of a synopsis box building unit according to an embodiment of the present invention.

FIG. 9 is a block diagram of a synopsis box builder 900 according to an embodiment of the present invention. The synopsis box builder 900 resides in the query interface 313 (shown in FIG. 3). The synopsis box builder 900 includes a user interface unit 910. The user interface unit 910 communicates with the wireless communications interface unit 234 (shown in FIG. 2) and receives input selections received by the wireless communication interface unit 234. The user interface unit 910 may for example receive an identity of a section of the selection listing area 622 (shown in FIG. 6) that is selected by a user. The section of the selection listing area 622 selected indicates an entertainment selection selected by the user.

A database interface unit 920 is coupled to the user interface unit 910. The database interface unit 920 receives an identity of the entertainment selection selected by the user and searches the database 320 (shown in FIG. 3) for a record corresponding to the entertainment selection. The record includes entertainment system data related to the entertainment selection selected.

A synopsis box building unit 930 is coupled to the database interface unit 930. The synopsis box building unit 930 displays the entertainment system data related to the entertainment selection in a display area of a display device. According to an embodiment of the present invention, the display area is a separate window or "synopsis box" on the display area. The synopsis box building unit 930 may present the entertainment system data in text form or as selectable identifiers.

According to an embodiment of the present invention, a set of entertainment system data that is linked to other entertainment system data is presented by the synopsis building unit 930 as a selectable identifier. When the selectable identifier is selected, the database interface unit 920 accesses a data portion in the set of entertainment system data that is linked and executes the instructions stored in the data portion. The instructions may include instructions that require data to be retrieved from the database 320 (shown in FIG. 3) or other location and displayed on the display device. The instructions may also include instructions that require a search be performed in the database 320 or other location and the results of the search displayed on the display device.

Figure 10:
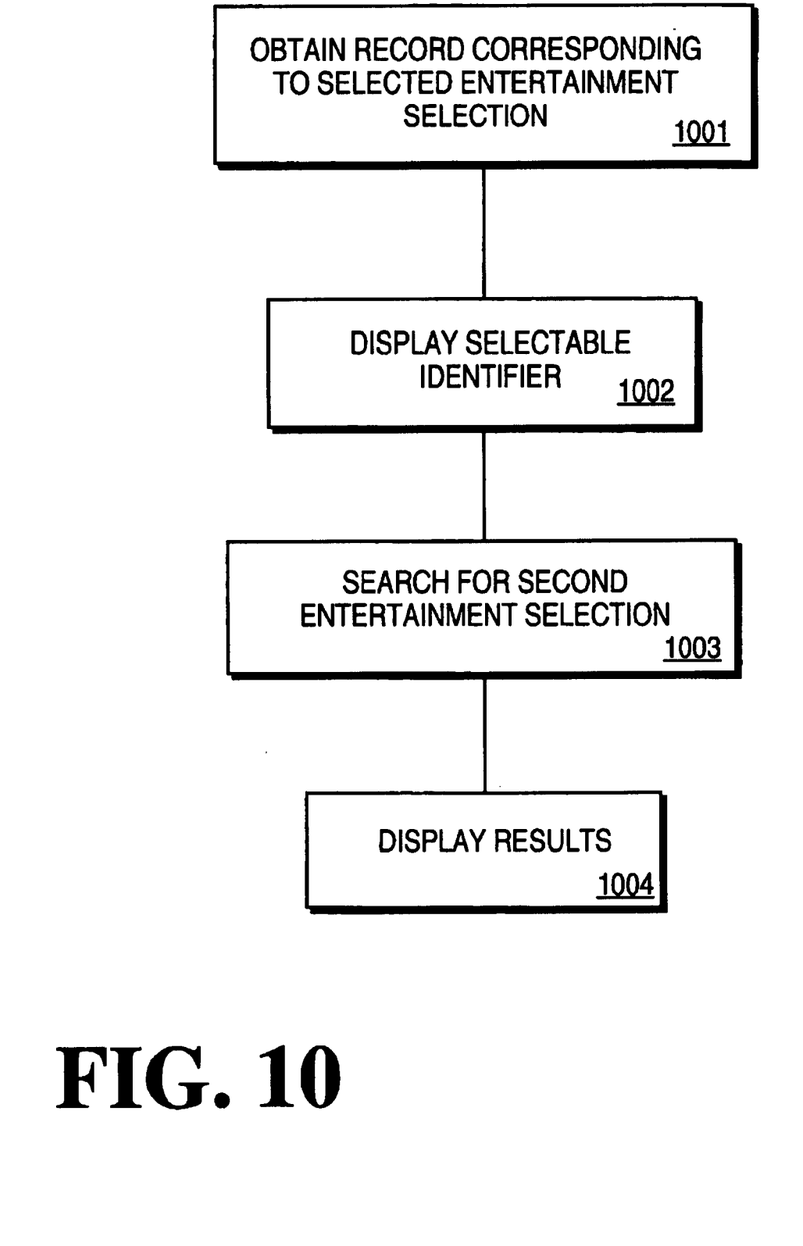
FIG. 10 is a flow chart illustrating a method for managing entertainment system data according to an embodiment of the present invention.

FIG. 10 is a flow chart illustrating a method for managing entertainment system data according to an embodiment of the present invention. At step 1001, a record corresponding to a first entertainment selection that is selected is obtained. According to an embodiment of the present invention, obtaining the record corresponding to the first entertainment selection is achieved by referencing an entertainment selection identifier of the first entertainment selection in a database.

At step 1002, a selectable identifier corresponding to a first set of entertainment system data in the record is displayed on a display device. According to an embodiment of the present invention, presenting the selectable identifier corresponding to the first set of entertainment system data in the record on the display device is achieved by generating an identifier that is distinguishable from non-selectable text.

At step 1003, a search for a second entertainment selection having a corresponding second set of entertainment system data related to the first set of entertainment system data is performed when the selectable identifier is selected. According to an embodiment of the present invention, performing the search for a second entertainment selection with the corresponding second set of entertainment system data related to the first set of entertainment system data is achieved by searching entertainment system data in the database.

At step 1004, a result of the search is presented on the display device.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than a restrictive sense.

What is claimed is:

1. A method for managing entertainment system data, comprising:

obtaining a record corresponding to a first entertainment selection;

presenting a first set of entertainment system data in the obtained record corresponding to the first entertainment selection on a display device;

presenting a selectable identifier corresponding to the first set of entertainment system data on the display device;

receiving a selection of the selectable identifier;

accessing instructions linked to the selectable identifier;

performing a search based on the accessed instructions for a second entertainment selection having a corresponding second set of entertainment system data related to the first set of entertainment system data; and presenting a result of the search on the display device.

2. The method of claim 1, wherein obtaining the record comprises referencing an entertainment selection identifier of the first entertainment selection in a database.

3. The method of claim 1, wherein presenting the selectable identifier comprises generating an identifier that is distinguishable from non-selectable text.

4. The method of claim 1, wherein performing the search comprises searching a database for the entertainment system data related to the first set of entertainment system data.

5. The method of claim 1, wherein presenting the result of the search comprises displaying the result of the search in a synopsis box on the display device.

6. The method of claim 1, wherein performing the search comprises performing a search of records of entertainment system data received from a plurality of different sources.

7. The method of claim 1, wherein the entertainment selections are selected from the group comprising programs, music selections, software applications, files, and Internet broadcasts.

8. The method of claim 1, wherein performing the search comprises performing a search in accordance with instructions stored with the first set of entertainment system data to find other entertainment selections.

9. The method of claim 1, wherein the second set of entertainment data is related to the first set of entertainment data in that an item of data corresponding to the same trait is the same in both sets of data.

10. A computer-readable medium having stored thereon a sequence of instructions, the sequence of instructions including instructions which, when executed by a processor, causes the processor to perform operations comprising:

obtaining a record corresponding to a first entertainment selection;

presenting a first set of entertainment system data in the obtained record corresponding to the first entertainment selection on a display device;

presenting a selectable identifier corresponding to the first set of entertainment system data on the display device;

receiving a selection of the selectable identifier;

accessing instructions linked to the selectable identifier;

performing a search based on the accessed instructions for a second entertainment selection having a corresponding second set of entertainment system data related to the first set of entertainment system data; and presenting a result of the search on the display device.

11. The computer-readable medium of claim 10, wherein obtaining the record comprises referencing an entertainment selection identifier of the first entertainment selection in a database.

12. The computer-readable medium of claim 10, wherein presenting the selectable identifier comprises generating an identifier that is distinguishable from non-selectable text.

13. The computer-readable medium of claim 10, wherein performing the search comprises searching a database for entertainment system data related to the first set of entertainment system data.

14. The computer-readable medium of claim 10, wherein presenting the result of the search comprises displaying the result of the search in a synopsis box on the display device.

15. The computer-readable medium of claim 10, wherein performing the search comprises performing a search of records of entertainment system data received from a plurality of different sources.

16. The computer-readable medium of claim 10, wherein the entertainment selections are selected from the group comprising programs, music selections, software applications, files, and Internet broadcasts.

17. The computer-readable medium of claim 10, wherein performing the search comprises performing a search in accordance with instructions stored with the first set of entertainment system data to find other entertainment selections.

18. The computer-readable medium of claim 10, wherein the second set of entertainment data is related to the first set of entertainment data in that an item of data corresponding to the same trait is the same in both sets of data.

19. A system control agent, comprising:

a data parser that formats entertainment system data into an identifier portion and a data portion;

a data engine, coupled to the data parser, that stores the entertainment system data into a database according to corresponding entertainment selections; and a query interface, coupled to the database, that configures a graphical user interface (GUI) having an identifier corresponding to a first set of entertainment system data of a first entertainment selection, the identifier being selectable to cause the query interface to execute instructions linked to the identifier that require a search to be performed in the data engine and to display a second entertainment selection, resulting from the search, having a corresponding second set of entertainment system data related to the first set of entertainment system data.

20. The system control agent of claim 19, wherein the query interface comprises:

a user interface unit that receives an identity of the identifier selected;

a database interface unit, coupled to the user interface, that searches the database for the second entertainment selection having the corresponding second set of entertainment system data related to the first set of entertainment system data; and a synopsis box building unit, coupled to the database interface unit, that displays the identity of the second entertainment selection on a display device.

21. The system control agent of claim 20, wherein the database interface unit searches the database in accordance with instructions that it retrieves from storage with the first set of entertainment system data.

22. The system control agent of claim 19, wherein the entertainment system data is received from a plurality of different sources.

23. A computer system, comprising:

a bus;

a processor coupled to the bus;

a system control agent, coupled to the bus, that includes a data parser that formats entertainment system data into an identifier portion and a data portion, a data engine that stores the entertainment system data into a database according to corresponding entertainment selections, a query interface that configures a graphical user interface (GUI) having an identifier corresponding to a first set of entertainment system data of a first entertainment selection, the identifier being selectable to cause the query interface to execute instructions linked to the identifier that require a search to be performed in the data engine and to display a second entertainment selection, resulting from the search, having a corresponding second set of entertainment system data related to the first set of entertainment system data.

24. The computer system of claim 23, wherein the query interface comprises:
- a user interface unit that receives an identity of the identifier selected;
- a database interface unit, coupled to the user interface, that searches the database for the second entertainment selection having the corresponding second set of entertainment system data related to the first set of entertainment system data; and
- a synopsis box building unit, coupled to the database interface unit, that displays the identity of the second entertainment selection on a display device.

25. A graphical user interface (GUI), comprising:
- a first set of entertainment system data corresponding to a first entertainment system selection;
- an identifier corresponding to the first set of entertainment system data of the first entertainment selection, the identifier being selectable to cause a query interface to execute instructions linked to the identifier that require a search to be performed in a data engine and to generate a synopsis box that displays a second set of entertainment system data of a second entertainment selection, resulting from the search, the second set of entertainment system data being related to the first set of entertainment system data.

26. The GUI of claim 25, further comprising non-selectable text corresponding to entertainment system data of the first entertainment selection.

27. The GUI of claim 26, wherein the selectable identifier is presented so that it is distinguishable from non-selectable text.

28. A method comprising:
- obtaining a record at an entertainment system, the record containing descriptive data describing a first program;
- presenting the descriptive data on a display device of the entertainment system;
- presenting a selectable identifier on the display device, the selectable identifier corresponding to the descriptive data;
- receiving a selection of the selectable identifier;
- accessing instructions linked to the selectable identifier;
- performing a search of records of the entertainment system based on the accessed instructions to identify a second program having descriptive data that is related to the descriptive data of the first program; and
- presenting a result of the search on the display device.

29. The method of claim 28, wherein presenting the selectable identifier comprises generating an identifier that is distinguishable from non-selectable text.

30. The method of claim 28, wherein performing the search comprises searching a database of records for programs, the records having identifiers and a data portion for each identifier, the data portion containing the descriptive data.

31. The method of claim 30, wherein performing the search comprises performing a search of records of data received from a plurality of different sources.

32. The method of claim 28, wherein performing the search comprises performing a search in accordance with instructions stored with the first set of descriptive data to find other programs.

33. The method of claim 28, wherein the descriptive data of the second program is related to the descriptive data of the first program in that an item of data is the same in both.

* * * * *